June 21, 1966    A. J. VALLELUNGA ET AL    3,257,564
AUXILIARY POWER OPERATION OF VEHICLE WINDSHIELD WIPER
Filed Nov. 20, 1961

INVENTORS
ANTHONY J. VALLELUNGA
& RICHARD SECOR

United States Patent Office 3,257,564
Patented June 21, 1966

3,257,564
AUXILIARY POWER OPERATION OF VEHICLE WINDSHIELD WIPER
Anthony J. Vallelunga and Richard E. Secor, both of 6 S. Chestnut St., New Platz, N.Y.
Filed Nov. 20, 1961, Ser. No. 153,395
1 Claim. (Cl. 307—64)

This invention relates generally to the operation of automobile accessory equipment, and more specifically to a system whereby the windshield wipers of a vehicle may be operated from an externally supplied power source.

Most modern windshield wipers operate electrically from the vehicle battery as disclosed in U.S. Patent 2,570,109, Gamundi, and to prevent excessive weakening of the battery, it is necessary to run the car motor during such periods. This practice is both wasteful and dangerous when the vehicle is stationary as is the case at drive-in theaters on a rainy night. Our invention is directed towards the provision of a power supply system by the theater which may be used by customers for the operation of the vehicle windshield wipers without draining the power from the vehicle battery.

It is therefore a primary object of this invention to provide a modified electrical circuit for operation of the windshield wipers which enables the circuit to be changed and energized by a power source externally of the vehicle.

It is a further object of this invention to provide a power supply system for distribution within drive-in theaters which may be tapped by customers for operating electrically driven windshield wipers during inclement weather conditions.

It is a still further object of this invention to provide a power supply system for drive-in theaters which cooperates through a plug to drive windshield wipers designed for six or twelve volt circuits.

A full understanding of the construction of this invention, together with further novel features and advantages, will be had from the following detailed description of a preferred embodiment thereof, taken in conjunction with the attached drawings wherein.

Figure 1:
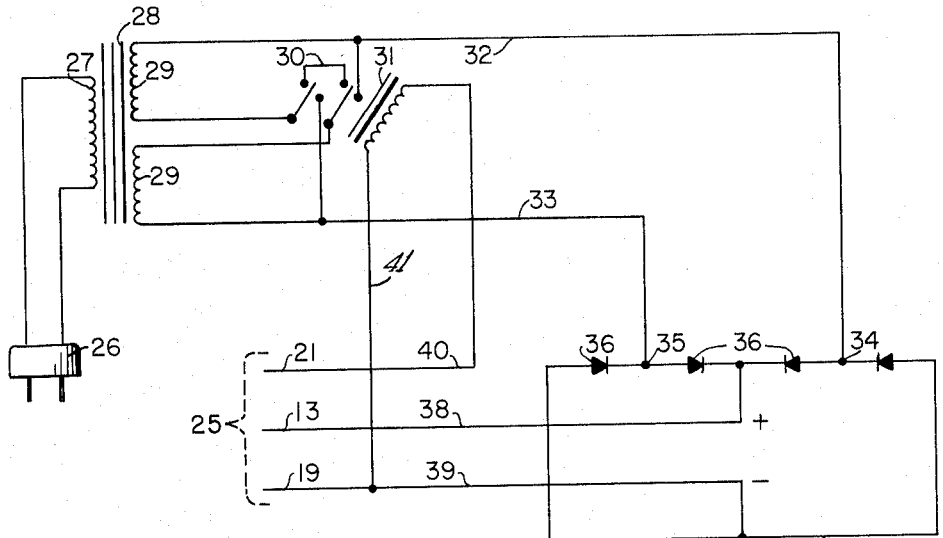
FIG. 1 is a diagrammatic wiring circuit showing the power supply system for distribution of direct current to the speaker posts for use by patrons.
Figure 2:
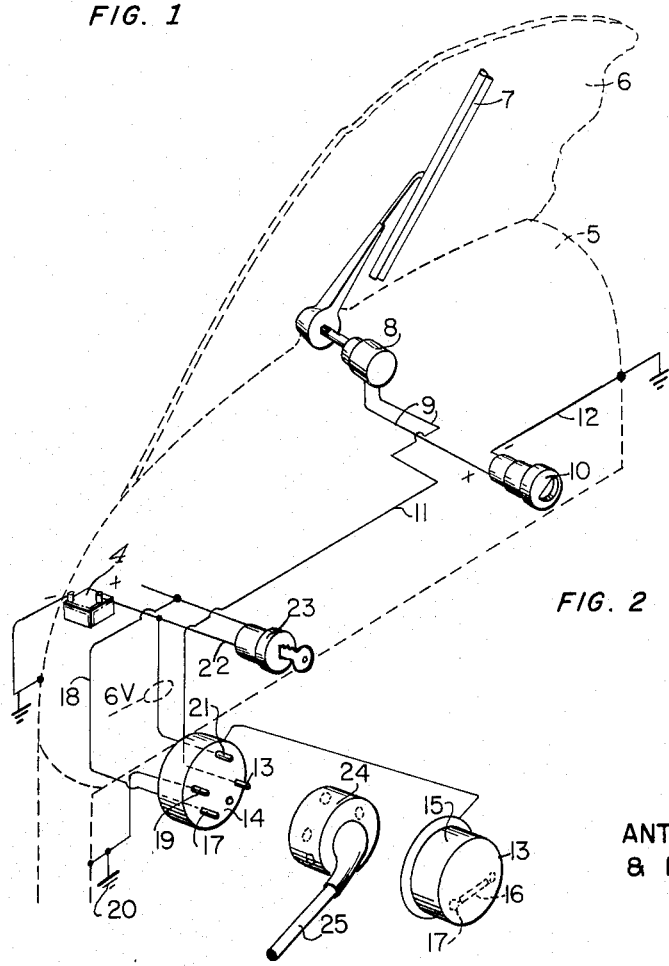
FIG. 2 is a perspective diagrammatic view showing the electrical modifications involved in the windshield wiper circuitry.

Referring now to the drawings in detail, the numeral 5 represents the outline of a vehicle dashboard which supports an upwardly extending windshild 6 and mounts an electrically operated windshield wiper 7 which is conventionally driven by a motor 8. The motor 8 is supplied with direct current through two wires 9 through a switch 10 with wire 12 grounded to receive current from the negative pole of a vehicle battery 4, which is grounded in the usual manner. The wire 11 terminates as a terminal 13 located in a plug 14 disposed beneath the dashboard. A cover 15 is adapted to close over the plug 14 for normal operation of the windshield wiper and contains a jumper lead 16 which connects first terminal 13 with a second terminal 17 through a wire 18 with the positive terminal of the battery when ignition switch 23 is on. Thus, with the jumper lead in position the conventional series circuit of battery 4, ignition switch 23, wiper motor switch 10, and wiper motor 8 is provided, and with ignition switch 23 on, the wiper will operate in a conventional manner in response to operation of switch 10 to complete the circuit to the battery of the vehicle. A third terminal 19 disposed in the plug 14 is suitably grounded to the vehicle at 20 and is thus connected to the negative pole of the battery. A fourth terminal 21 is connected to the live line 22 of the car ignition switch 23, wire 22 being connected to the positive pole of battery 4. With the ignition switch off, power may be supplied to the windshield wiper 7 by means of a plug jack 24 which is adapted to mount over the plug 14 after removing the cover 15. The plug jack is fed by means of a cable 25 which connects with the power supply system to be described forthwith.

The power supply is designed to operate from a 117 volt alternating current input plug 26, the said plug being connected in series with the primary winding 27 of a transformer 28. Two six volt circuits are withdrawn from the secondary side of the transformer, as indicated at 29 and 30. The two circuits may be combined in series or parallel by means of a two pole switch 30, the said switch being operative in response to a relay 31 to enable the voltage of the two secondary windings to be doubled at half current capacity or connected in parallel when on full load. A wire 32 and a wire 33 from each of the secondary circuits 29 terminate at 34 and 35 intermediate two pairs of rectifiers 36 connected to each other in an opposed series relationship by means of a closed loop wire 37. The terminal 13 which is connected with the wiper switch 10 connects through the plug 24 with a wire 38 which terminates intermediate the two pairs of opposed rectifiers 36 so as to provide a positive potential. The terminal 19 which is grounded on the vehicle connects through the plug jack 24 with a wire 39 which terminates on the negative side of the rectifier closed loop wire 37. The terminal 21 which connects with the hot side of the ignition switch 23 on the vehicle, connects with the plug jack 24 and a line 40 which terminates on one side of the relay switch 31 the other side of relay 21 being connected to wire 39 by wire 41. Thus, when plug jack 24 is connected to plug 14, relay 31 is connected to the vehicle battery. Relay 31 has a pull-in voltage of 12 volts to assure that the contacts of the switch 30 will switch to the FIG. 1 position only when the vehicle battery is 12 volts, but not if the vehicle battery is 6 volts. Hence, the voltage supplied from the power source is determined by the voltage of the vehicle battery.

In summary, we have used an isolation step down or reducing transformer for feeding a single face bridge rectifier by means of a twelve volt relay. The transformer windings are switched to a parallel or series configuration so as to enable the voltage of the two windings to be additive at half current capacity and in parallel at full current capacity depending upon the voltage of the vehicle battery. It should be pointed out that the terminal 21 leading to the hot side of the ignition switch is only necessary for vehicles with twelve volt circuits and may be removed when used on vehicles operating at six volts. A suitable color coding may be designated to the wiring to ensure their proper installation of the plug jack in the vehicle wiring circuit, the actual colors chosen is a matter of choice.

Having described the invention in a preferred form, it will be appreciated that some modifications may be made to the precise wiring diagram disclosed, without departing from the scope or spirit of the invention, as defined by the following claim.

We claim:
In an automotive vehicle having a battery, an electric windshield wiper motor, an ignition switch, and a windshield wiper motor switch connected in series circuit relation by connecting wires, the improvement comprising
 a power source externally of the vehicle
 a power input plug mounted on the vehicle and comprising first and second terminals connected in one of the connecting wires of said series circuit and interrupting said circuit, said first terminal being connected to said windshield wiper motor, and said second terminal being connected to one of the poles of the vehicle battery via the ignition switch, and a third terminal connected to the other pole of the vehicle battery; and connector means detachably connectable to said plug to connect said first and second terminals to complete said series circuit when positioned on said plug; said external source of power including plug jack means connectable to said plug after said connector means is removed to supply current of the same polarity as said one pole of said battery to said first terminal, and to supply current of the same polarity as said other pole of said battery to said third terminal;

whereby, said windshield wiper motor can be powered from said vehicle battery when said connector means is in position on said plug, and can be operated from said external power source when said connector means is removed and said plug jack is connected to said plug.

References Cited by the Examiner

UNITED STATES PATENTS 2,591,618   4/1952   Schaeffer _____ 290—629

LLOYD McCOLLUM, *Primary Examiner.*

L. R. CASSETT, *Assistant Examiner.*